United States Patent
Allen et al.

(10) Patent No.: US 10,071,314 B2
(45) Date of Patent: Sep. 11, 2018

(54) MULTI-CHARACTER INTERACTION SCENARIO

(71) Applicant: ELECTRONIC ARTS INC., Redwood City, CA (US)

(72) Inventors: Henry Allen, Longwood, FL (US); Simon Sherr, Casselberry, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 76 days.

(21) Appl. No.: 15/199,328

(22) Filed: Jun. 30, 2016

(65) Prior Publication Data

US 2018/0001202 A1    Jan. 4, 2018

(51) Int. Cl.
A63F 13/57    (2014.01)

(52) U.S. Cl.
CPC ...... *A63F 13/57* (2014.09); *A63F 2300/6607* (2013.01); *A63F 2300/6623* (2013.01)

(58) Field of Classification Search
CPC .............. A63F 13/57; A63F 2300/6607; A63F 2300/6623
See application file for complete search history.

(56) References Cited

U.S. PATENT DOCUMENTS

| | | | |
|---|---|---|---|
| 2005/0171964 A1* | 8/2005 | Kulas | G06T 13/00 |
| 2008/0037829 A1* | 2/2008 | Givon | G06K 9/3216 |
| | | | 382/107 |
| 2017/0309309 A1* | 10/2017 | Kaldma | G11B 27/031 |

OTHER PUBLICATIONS

KiteGr, Shin Megami Tensei: Persona—Optional Characters Guide, May 11, 2011, IGN.com, available at «http://www.ign.com/faqs/2011/persona-optional-characters-guide-1167734».*

* cited by examiner

*Primary Examiner* — Werner Garner
(74) *Attorney, Agent, or Firm* — Lowenstein Sandler LLP (57) ABSTRACT

A method of multi-character interaction scenario may include identifying three or more game characters associated with a game and assigning the three or more identified game characters to one or more predefined animation roles associated with one or more interaction scenarios of the game. The method may further include selecting one or more interaction scenario animations that comprise the three or more identified game characters and corresponding assigned animation roles. The method may further include providing the identified game characters, the corresponding assigned animation roles, and the selected interaction scenario animations for display in the game.

20 Claims, 7 Drawing Sheets

MULTI-CHARACTER INTERACTION SCENARIO

TECHNICAL FIELD

The present disclosure is generally related to a multi-character interaction scenario, and is more specifically related to identifying and selecting game characters, assigning roles, selecting interaction scenarios, and coordinating playing scenarios while aligning the characters.

BACKGROUND

Many developers of video games struggle to create interaction scenarios containing multiple characters. An interaction scenario may be an animated scene in a video game, in which multiple game characters perform certain predefined and coordinated animations. Traditional solutions to the problem of which game characters to include in particular interaction scenarios and which interaction scenarios are appropriate for the presently available game characters and context are clumsy and inefficient. The present disclosure addresses traditional deficiencies by allowing developers to fine-tune game character roles, animation slots, and interaction scenarios.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for multi-character interaction scenarios. Such methods and systems may allow games to select and trigger interaction animations involving many characters during gameplay.

One way in which interaction scenarios (e.g., animation scenarios that may include any number of game characters) may be created is by using a physics engine. Physics engines simulate animations based on physics movements. One problem that arises with using physics engines to define animation sequences is that physics engines may not render as natural an animation as the type of motion captured or hand-authored animation that predeveloped animation interaction scenarios are able to provide.

Another way in which interaction may be created is by using a cinematic solution. In a cinematic solution, game characters may be "teleported" to desired locations where a cinematic set piece is played with the use of a camera cut to hide the teleport. Such a solution may not be desirable because the camera cut or some other trick to hide the repositioning of the participants may look unnatural and clumsy. Developers creating a cinematic solution may also hard code or pre-define the game character participants, which limits the flexibility in which game characters are allowed in the interaction.

Alternatively, game developers may choose to not play an animation when more than two game characters are present or to pick the two best game characters for an interaction and leave the rest out, opting to not adopt one of the above solutions.

Embodiments of the present disclosure address the above problems by allowing games to select and trigger interaction animations involving many characters during gameplay. Embodiments described herein describe operations that include identifying potential participants, organizing them into pre-defined available 'slots' in the interaction, processing available animations to select the best match for the set of slot candidates, and playing back the animations with an alignment system that adjusts the character positions over time to ensure the resulting in game interaction alignment of the characters matches the authored animation. This system gives content creators complete control to define the conditions for interaction and the context for assigning slots, selecting the best animation, and controlling how alignment is achieved. It should be noted that while the embodiments described herein may refer to specific game characters and/or games, the operations described herein are applicable to any game character and any game.

Figure 1:
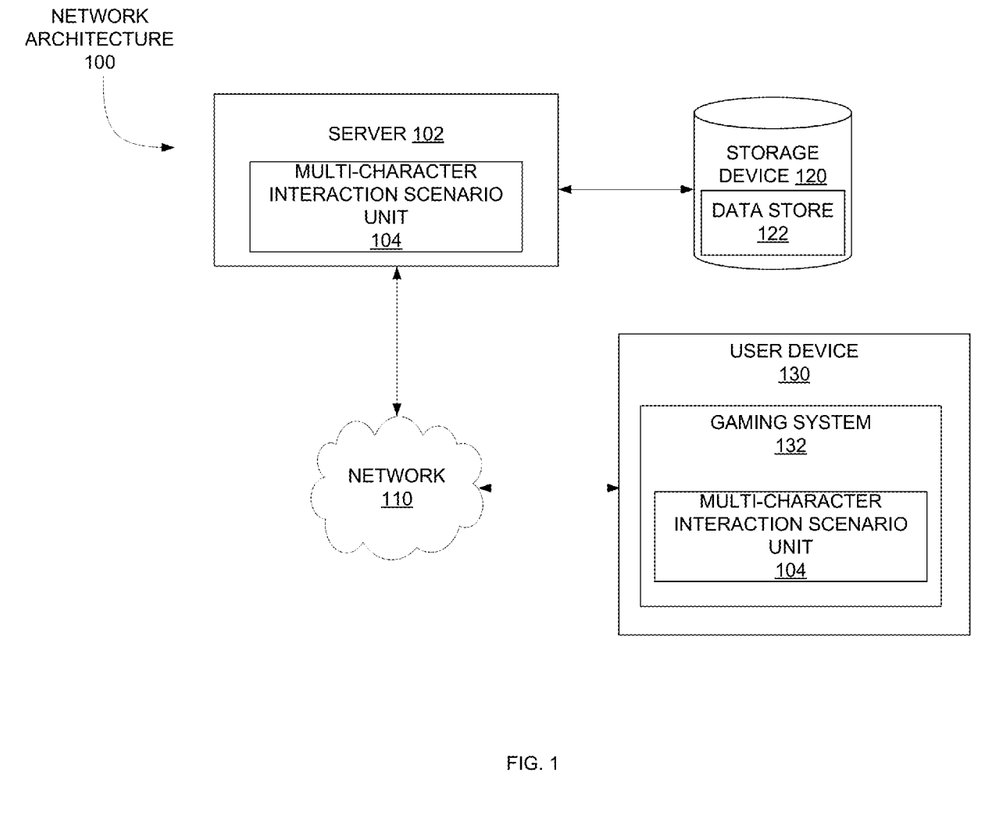
FIG. 1 is a block diagram illustrating an exemplary network architecture in which embodiments of the present disclosure may be implemented.

FIG. 1 is a block diagram illustrating an exemplary network architecture in which embodiments of the present disclosure may be implemented. The network architecture 100 may include one or more servers 102 communicating with one or more storage devices 120 and one or more user devices 130 over one or more networks 110, according to one embodiment. Network 110 can be a local area network (LAN), a wireless network, a telephone network, a mobile communications network, a wide area network (WAN), such as the Internet, or similar communication system.

Server 102 may include a network-accessible server-based functionality, various data stores, and/or other data processing equipment. The server 102 may be implemented by a single machine or a cluster of machines. Server 102 may include, for example, computer system 700 of FIG. 7. In one embodiment, server 102 includes multi-character interaction scenario unit 104. In another embodiment, gaming system 132 of user device 130 may include multi-character interaction scenario unit 104. Multi-character interaction scenario unit 104 may perform multi-character interaction scenario operations on data provided by storage device 120 and/or user devices 130.

Server 102 may be one server or it may represent multiple servers. In one embodiment, when a first user device connects to server 102 and a second user device connects to server 102, server 102 may be the same server that handles both devices' connections. In another embodiment, when a first user device connects to server 102 and a second user device connects to server 102, server 102 may represent different servers, so that each device connects to a different server.

In one embodiment, storage device 120 includes data store 122, which may include data provided by server 102 and/or user devices 130. In another embodiment, data provided by server 102 and/or user devices 130 are stored elsewhere, outside of data store 122 or storage device 120.

In one embodiment, server 102 may include multi-character interaction scenario unit 104 and storage device 120. In another embodiment, storage device 120 may be external to server 102 and may be connected to server 102 over a network or other connection. In other embodiments, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, user devices 130 may be any computing device (e.g., personal computer, server, mobile device, tablet, game system etc.). User device may include, for example, computer system 700 of FIG. 7. User devices 130 may include gaming system 132. In one embodiment, gaming system 132 provides access to a video game including multi-character interaction scenarios, as described herein. In one embodiment, gaming system 132 may include multi-character interaction scenario unit 104. In this embodiment, system 100 may not include server 102 and/or multi-character interaction scenario unit 104 of server 102. User devices 130 may be connected via network 110.

Figure 2:
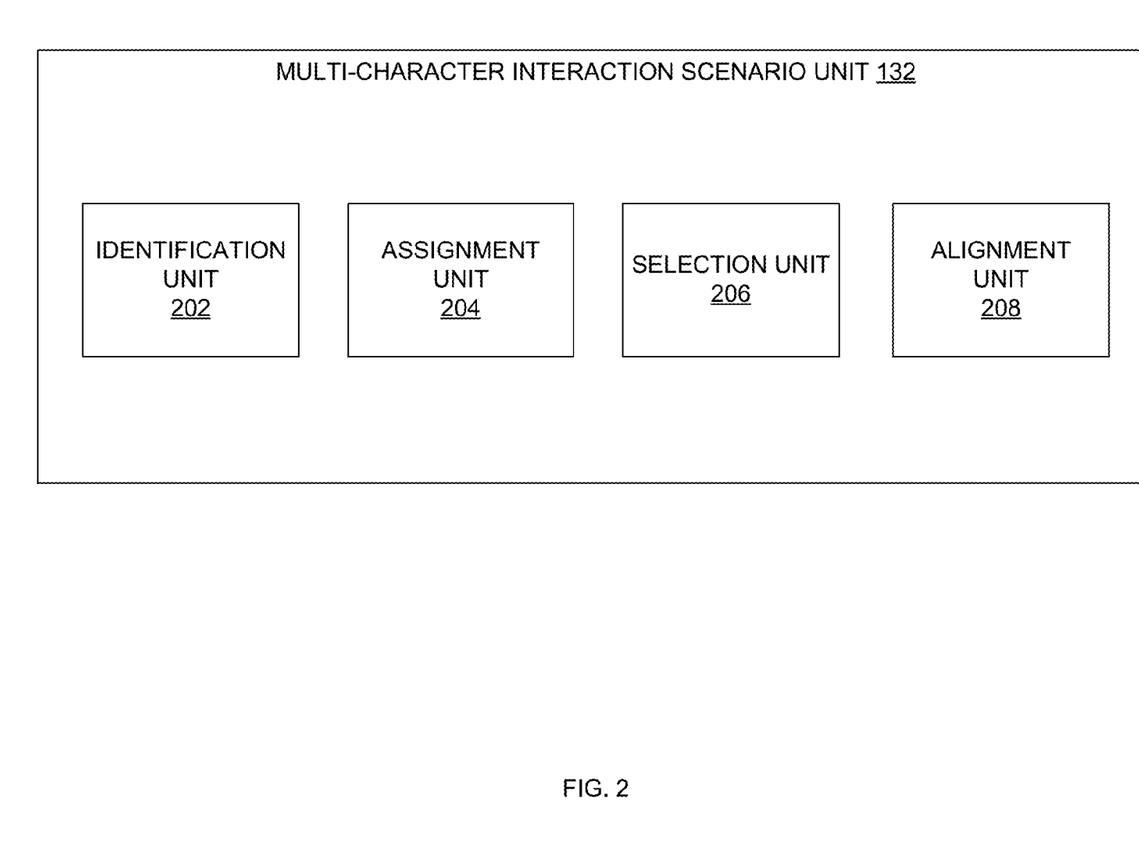
FIG. 2 is a block diagram illustrating a multi-character interaction scenario unit, according to an implementation.

FIG. 2 is a block diagram illustrating a multi-character interacting scenario unit 104, according to an implementation. In one embodiment, multi-character interaction scenario unit 104 is included in user device 130 and/or server 102 of FIG. 1. Multi-character interaction scenario unit may include an identification unit 202, assignment unit 204, selection unit 206, and alignment unit 208. This arrangement of units may be a logical separation, and in other embodiments, these units or other components can be combined together or separated in further components, according to a particular embodiment.

Identification unit 202 may be responsible for identifying three or more game characters that may be eligible for a particular interaction scenario in the game. In should be noted that while embodiments of the present disclosure are described with respect to three or more game characters for convenience, the operations described herein may be utilized on any number of game characters (e.g., one or more). In one embodiment, potentially eligible game characters are identified by comparing game character characteristics and metrics to predefined identification characteristics and metrics. For example, all game characters within a certain proximity to a ball carrier in a football game may be identified as potential game characters for an animation interaction involving the ball carrier. In another embodiment, a game character is identified by receiving a request from the game character to enter an interaction scenario. For example, identification unit 202 may identify all game characters who have requested to be added to an interaction scenario.

In one embodiment, assignment unit 204 assigns the three or more identified game characters to three or more predefined animation roles (slots) associated with one or more interaction scenarios of the game. Identified game characters are assigned based on conditions that must be met in order for the character to be assigned to a particular slot in an interaction. For example, a game character in a football game may be identified by comparing his "ball carrying?" status to a set of predefined characteristics and metrics. In one embodiment, if the game character has a status of "is ball carrying," the game character may be assigned to the "ball carrier" slot in an interaction scenario.

Additionally, assignment unit 204 may take into account physical filters, which may dictate physical relationships between the candidates in order for them to be slotted (e.g., Tackler 1 should be in front of the Ball Carrier with a 20 degree tolerance, Tackler 2 at 45 degrees with a 20 degree tolerance, etc.).

In one embodiment, each slot may be a master, mandatory, optional or disabled slot. A master slot may be the key character in the interaction (e.g., the ball carrier). Optional slots may be for cases where the interaction can occur whether or not a character is available for that slot (e.g., a second tackler). Mandatory slots may mean that the slot must be filled for the interaction to start. Disabled may indicate that there is not support for the slot.

During runtime of the game when interactions are being requested, assignment unit 204 may evaluate the identified game characters to see which slots they qualify for and, if there are candidates for all non-optional slots, make the assignments and proceed to selection. In one embodiment, a given slot may have multiple game character candidates and/or a game character may qualify for multiple slots. Game characters may be assigned to slots based on which game characters are most likely to yield a successful selection that matches as many of the available candidates as possible.

In one embodiment, the assignment operations are iterative. For example, assignment unit 204 may perform operations related to the following pseudo code:

Iterate through each slot in priority order and assign the best remaining available candidate to the slot
Slot Priority may be dictated by:
Mandatory slots may be assigned first.
Slots may be prioritized based on a quantized slot priority based on how many times that slot appears as mandatory in the interaction scenario.
a slot can be mandatory on the interaction scenario itself, (e.g., that slot is required to play any contained interaction scenario animation).
a slot that is optional on the interaction scenario may be mandatory for specific interaction scenario animations (e.g., the scenario may be started without that slot assigned but there are certain animations that may not be selected without it).
For these 'sometimes mandatory' slots, create n 'priority levels' such that a slot that is mandatory for 80% of interaction scenario animations is prioritized higher than one that is mandatory for 20% of them. The 'priority levels' may be used to keep similar percentages at the same priority so other logic may be used to decide their priority. That is, 80% is >20% but 20% may be treated as the same priority as 15% or 25%.
Prioritize slots that have fewer available candidates remaining for the slot over those with more. Advantageously, there may be a better chance of maximizing participation by filling in the slots with less candidates first.

Slots may be prioritized based on which remaining slot's best candidate has the best 'score' for that slot.

When physical conditions are used for assignment, things like distance and angle checks may get a score (e.g., closer to exact match scores better than farther from a match. A slot that has a better match may be assigned before assigning slots that don't have as good of a match available).

Score may also optionally be influenced by game logic and/or context (e.g., 'BlockAbility' could be a gamestate input that affects score when assigning a 'Blocker' slot).

It should be mentioned that the above prioritization may be implemented in a different order or have additional factors considered. After the order in which to assign slots has been determined, the actual assignment may be performed by assigning the highest scoring candidate to a slot (e.g., based on physical conditions matching and/or game logic and/or context). If candidates are tied on score, assignment may be determined by determining and assigning the candidate that is a candidate for fewer slots.

In one embodiment, selection unit 206 selects an interaction scenario that includes the three or more identified game characters and corresponding assigned animation roles. Selection unit 206 may choose the interaction scenario animation given a group of candidates assigned to slots. Selection unit 206 may read from a table of animations that indicates which animations may be played in a given scenario. In one embodiment, the table may be stored in data store 122 of storage device 120. Each row in the table may represent an animation and each column may represent a context and/or condition that may be required to play a specific animation. The columns may be game logic context (e.g., a game state like 'IsDefense') or physical based (e.g., angle to Ball Carrier). Since the interaction may involve multiple participants and the participants each have their own state, each column supports identifying a slot to associate it with (for example, 'Tackler1.IsDefense'). The physical based conditions may be auto populated by operations that examine the animation associated with that row and apply a user defined tolerance (e.g., Tackler1.AngleTo Ball Carrier may be populated by looking at the sequence for that row and calculating the Angle between Tackler 1 and the Ball Carrier in that particular sequence, then applying a user-defined matching tolerance (e.g., +/−15 degrees).

During game runtime, selection unit 206 may pre-calculate the context values and run through the table and identify any rows that pass all requirements for all slots that are required and present. If any matches are found, selection unit 206 may select from among the valid choices using various heuristics. For example, selection may be based on animations with more assigned slot participants (e.g., preference may be given to a 4 man tackle over a 2 man tackle). In one embodiment, the content creator or designer may prefer certain animations to others and assign them a higher priority so they will be preferred. Priority may be given to interaction scenario animations that have been chosen less so a user sees more variety. Selection unit may score choices based on how well the columns matched, how well the most important columns matched, or some other metric and then choose from among the best scores.

If selection unit 206 successfully finds a matching animation, the selection unit 206 may fire off the appropriate animations and/or state for each game character and kick off an alignment driver (e.g., alignment unit 208) which may be responsible for pulling the characters into alignment as the interaction occurs.

In one embodiment, alignment unit 208 may align the three or more game characters to positions associated with the corresponding assigned animation roles, based on the selected interaction scenario animation. Alignment may be a rotational alignment, including the complete rotation of game characters and the rotation of individual body parts of the characters. Alignment may also include translational movements, where entire game characters or body parts of characters are translated from one physical location to another. In one embodiment, alignment unit 208 may align the game characters during the animation interaction scenario. Advantageously, aligning during animation, instead of before the animation is allowed to begin, provides for a natural looking animation sequence.

Figure 3:
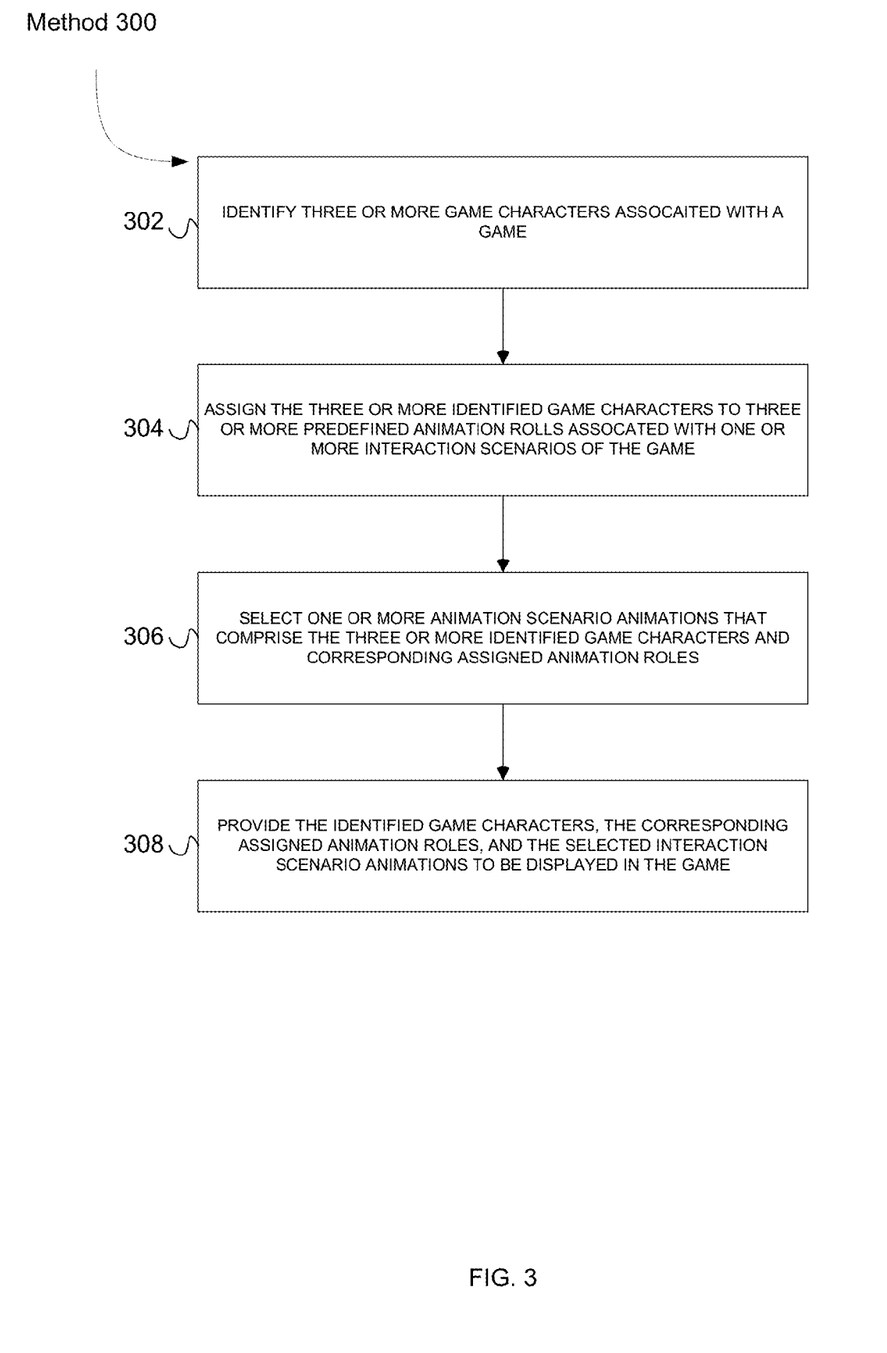
FIG. 3 is a flow diagram illustrating a multi-character interaction scenario processing flow, according to an implementation.

FIG. 3 is a flow diagram illustrating a multi-character interaction scenario processing flow, according to an implementation. The processing flow method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can provide operations for a multi-character interaction scenario. In one embodiment, multi-character interaction scenario unit 104 may perform method 300. Method 300 may be performed in any order so as to fit the needs of the functionality to be provided.

Referring to FIG. 3, at block 302, processing logic identifies three or more game characters associated with a game. In one embodiment, game characters are identified based on their proximity to an identified player in the game (e.g., a ball carrier). In another embodiment, game players are identified based on one or more other contextual or physical characteristics described herein. At block 304, processing logic assigns the three or more identified game characters to three or more predefined animation roles associated with one or more interaction scenarios of the game. In one embodiment, an interaction scenario may be a game-time scenario for which animations have been defined. For example, a football game may have a "tackles" interaction scenario that plays during tackle actions in the game. Assignment may be based on various contextual or physical characteristics, such as whether a player is carrying a ball, which direction the character is facing, which how far away one character is from another, etc. Animation roles may be predefined, such as "ball carrier," "tackler," "kicker," "attacker," defender," etc. Each animation role may be associated with different contextual and/or physical requisites, so that game characters may accurately be assigned to proper roles.

Figure 6A:
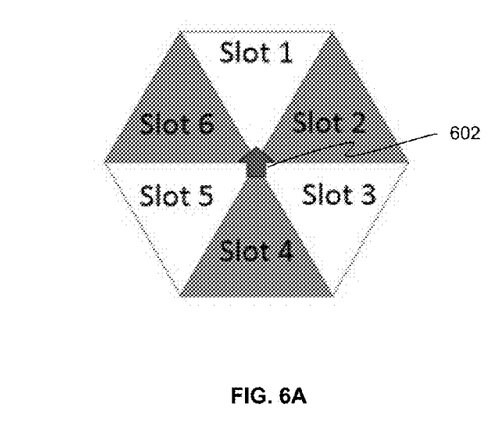
FIG. 6A is a first block diagram illustrating flexible slot assignment, according to an implementation.

At block 306, processing logic selects one or more interaction scenario animations that include the three or more identified game characters and corresponding assigned animation roles. In one embodiment, interaction scenario animations may be individual animations for each game character in an interaction scenario. As described above, processing logic may select an interaction scenario animation based on a table identifying slots and slot conditions for numerous interaction scenario animations. In one embodiment, when two or more game characters satisfy the conditions for a single slot, processing logic determines which of the game characters, if any, should be assigned to the slot. Further operations regarding this feature are described with respect to FIG. 6.

Processing logic may determine that there are multiple entry windows to the selected interaction scenario animation and determine into which entry window game characters should be inserted. For example, a 2-step layup interaction scenario animation in a basketball game may include 3 entry windows that define a 2-step, 1-step, and 0-step layup. If the ball carrier in the animation is 2-steps away from the hoop, processing logic may determine that the character may enter the layup interaction scenario animation at the 2-step entry window. Alternatively, the character may enter the interaction scenario at the 1-step entry window if he is one step away from the hoop when the scenario is to begin.

Furthermore, in one embodiment, processing logic may mirror animations in interaction scenarios in real time. If a layup interaction scenario animation was created for a right-handed layup, processing logic may mirror the scenario if a player is attempting a left-handed layup without the creation of a left-handed layup interaction scenario animation.

At block 308, processing logic provides the identified game characters, the corresponding assigned animation roles, and the selected interaction scenario for display in the game. Processing logic may align the game characters and provide the alignment characteristics for display in the game. In one embodiment, processing logic aligns a first game character of the three or more game characters to a second game character of the three or more game characters. In another embodiment, processing logic aligns all but one game character of the three or more game characters to the remaining game character of the three or more game characters. Processing logic may determine and apply an "alignment lock" threshold, during which time the processing logic maintains alignment to the first game character by the second game character (or to a single game character by multiple game characters) while the first game character is moving. Advantageously, alignment lock may be useful to guard against other systems (e.g., physics, expressions, collisions, etc.) attempting to move the characters. For example, processing logic may align a first game character of the three or more game characters to a second game character of the three or more game characters and maintain alignment to the first game character by the second game character while the first game character is moving (driving or steering the second game character) during the specified duration.

In another embodiment, processing logic may align all but one game character of the three or more game characters to a remaining game character of the three or more game characters and maintain alignment to the remaining game character by those game characters while the remaining game character is moving (driving or steering the remaining game character) during the specified duration. Furthermore, processing logic may align-lock one or more characters to a position, instead of or in addition to aligning to another character. In this embodiment, the one or more positionally align-locked characters may be prevented from being moved by external forces.

In one embodiment, processing logic may alignment-lock characters while the characters are aligning. For example, an attacker may be alignment-locked to a defender, so that if the defender is moving (e.g., backing away from the attacker), the attacker may perform additional alignment operations to align to the position to where the defender is moving. In another embodiment, processing logic may lock characters after initial alignment has occurred. For example, processing logic may lock an aligned defender to an attacker so that the attacker can steer the defender. As described in the above embodiment, processing logic may cause a first character to be aligned to a second during alignment, and the second to be aligned to the first after alignment. It should be mentioned that the locking features described herein are optional, and may be activated or deactivated by the processing logic.

In one embodiment, processing logic may prevent a character in a multi-character interaction from leaving the interaction by synchronizing state machine of game characters requesting to be added to an interaction scenario. Once a character's state machine is synchronized with the other state machines in the interaction scenario that character may not be allowed to unilaterally leave the scenario.

In one embodiment, processing logic may align game characters based on their velocity. For example, if two game characters are supposed to be aligned to collide, processing logic may take into account each player's in-game velocity to determine an alignment path that maintains individual characters' momentum, based on their velocity. It should be noted that processing logic may align game characters to a predefined object in the scene, instead of to each other. For example, game characters may be aligned with respect to a basketball hoop, or some other object in the interaction scenario. Entire interaction scenarios may be aimed towards such an object during animation.

Furthermore, processing logic may target-chain align a first game character with respect to a second game character, and a third game character with respect to the first game character. Advantageously, processing logic may align game characters during the animation of the interaction scenario instead of first aligning, then performing the animations. By aligning during animation, animations are provided a much more life-like flow.

In one embodiment, processing logic may perform alignment separately for rotational and translational alignment movements according to predefined thresholds. For example, a rotational threshold may dictate that the rotational portion of the alignment may be performed during the first three frames of alignment, and a translational threshold may determine that the translation portion of the alignment occur during the next three frames. By enabling granule, fine-tuned control over rotational and translational alignment movements individually, more life-like alignments may result. Processing logic may also determine an alignment rotation of each game character in a multi-character interaction that minimizes rotation of each individual character. In another embodiment, the alignment rotation for each game character may be determined to minimize unnatural warping and maximize life-like animations. To further minimize warping, in one embodiment, game characters may be aligned to tolerances, instead of to precise values. For example, by defining goal alignment tolerances, game characters may be able to undergo less warping, thereby providing a more life-like animation.

Figure 4:
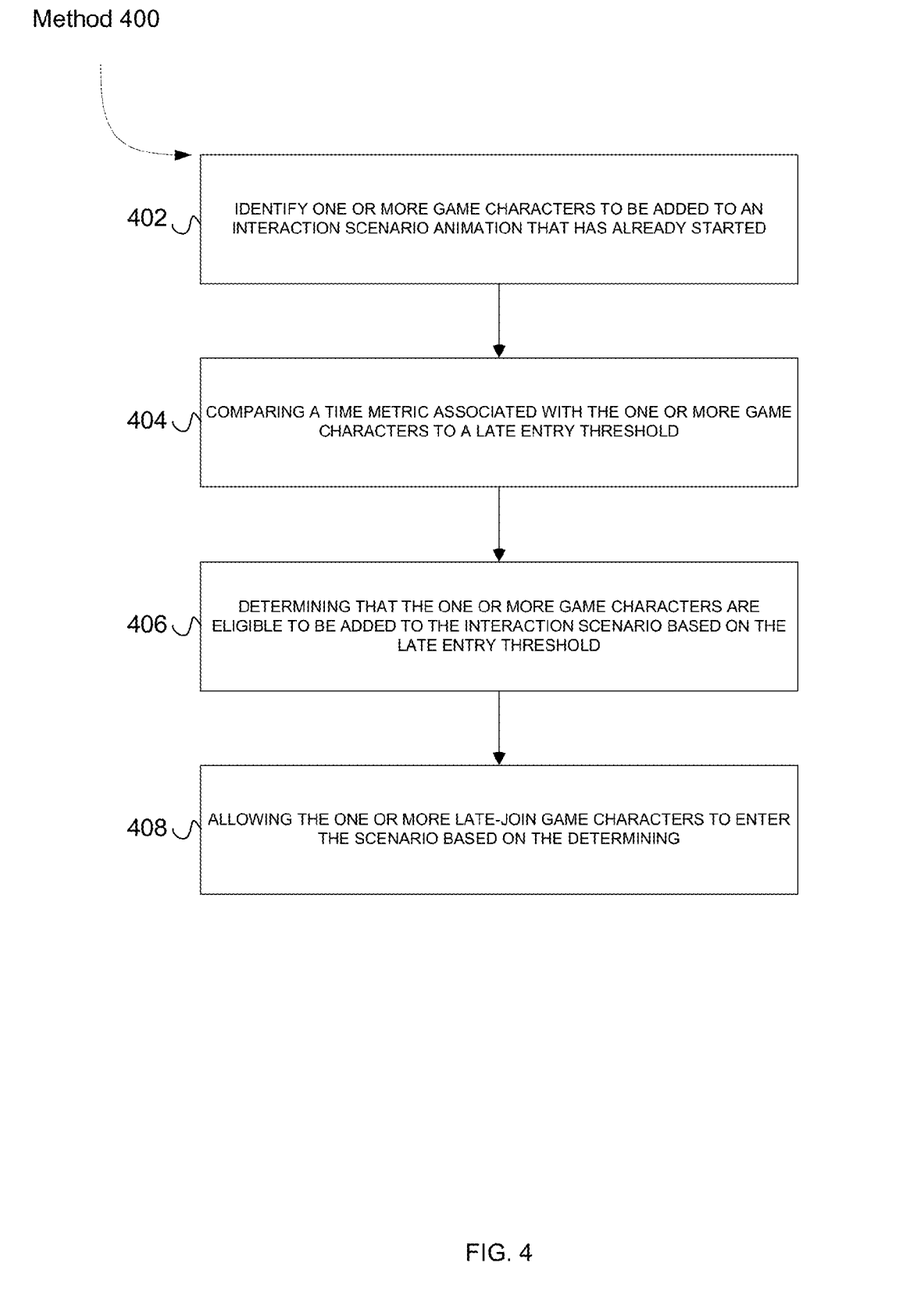
FIG. 4 is a flow diagram illustrating a late-join game character interaction scenario processing flow, according to an implementation.

FIG. 4 is a flow diagram illustrating a late-join game character multi-character interaction scenario processing flow, according to an implementation. The processing flow method 400 may be performed by processing logic that comprises hardware (e.g., circuitry, dedicated logic, programmable logic, microcode, etc.), software (e.g., instructions run on a processing device to perform hardware simulation), or a combination thereof. Method 400 can provide operations for a multi-character interaction scenario. In one embodiment, multi-character interaction scenario unit 104 may perform method 400. Method 400 may be performed in any order so as to fit the needs of the functionality to be provided.

At bock 402 of method 400, processing logic identifies one or more game characters to be added to the interaction scenario in progress. In one embodiment, late-join characters are game characters who request to be added to an interaction scenario when the interaction scenario has already started. Late-join characters may be assigned to optional slots, and an interaction scenario may be started with empty optional slots. Processing logic may identify the late-join characters by identifying a request by one of the characters to enter an interaction scenario. In one embodiment, for a character to join an interaction scenario late, processing logic determines if the character passes the standard scenario conditions for the appropriate slot, as described herein.

In one embodiment, physical conditions may be modified to reflect the current time in the animation. In one example, the original animation at Frame 0 has Slot A being 10 yards from Slot B, and the selection criteria is that, to play this interaction scenario animation, the distance between A and B must be 8 to 12 yards. The example may further include a late join to be evaluated at frame 20, and at Frame 20 of the original animation A and B are 4 yards apart. In this example, to late join, instead of requiring 8-12 yards the tolerances of +/−2 yards may be extrapolated and applied to the distance at the current time in the source animation. So, late join may be allowed at Frame 20 if the characters are 2-6 yards apart instead of the 8-12 used for Frame 0. Similar operations may be applied to angles, speed, and other physical conditions. Additionally, tolerances may be scaled down as the animation progresses, to reduce the amount of alignment required when there may be less time to hide it.

At block 404, processing logic may compare a time metric associated with the one or more late-join characters to one or more late entry thresholds in the interaction scenario animation in progress. For example, optional slots in the current interaction scenario animation may define an entry threshold that determines when it is valid for a game character to enter into an interaction scenario.

When a game character is determined to be eligible to late-join an interaction scenario, processing logic may adjust the alignment settings for the slot to which the character is assigned. In one embodiment, an ideal alignment range may exist that indicates a threshold of time during which alignment may not have to adjusted or minimally adjusted. The ideal alignment range may be the ideal start and end time (and thus duration) that may be used to go from unaligned to fully aligned. If a character enters the interaction late, processing logic may start aligning later because the character entered late, but may still try to spend the ideal duration aligning. If alignment is determined to last longer than an "end alignment" threshold, the ideal alignment time may be compressed so as not to carry on aligning beyond this threshold.

Minimum alignment duration may also be specified. If a game character enters an interaction scenario very late, processing logic may determine based on the minimum alignment duration how much alignment may be sped up to meet the end alignment threshold.

In one embodiment, processing logic at block 406 determines that the one or more late-join characters are eligible to be added to the interaction scenario based on the comparison and processing logic at block 408 allows the one or more late game characters to enter the scenario based determining that they are eligible.

Figure 5:
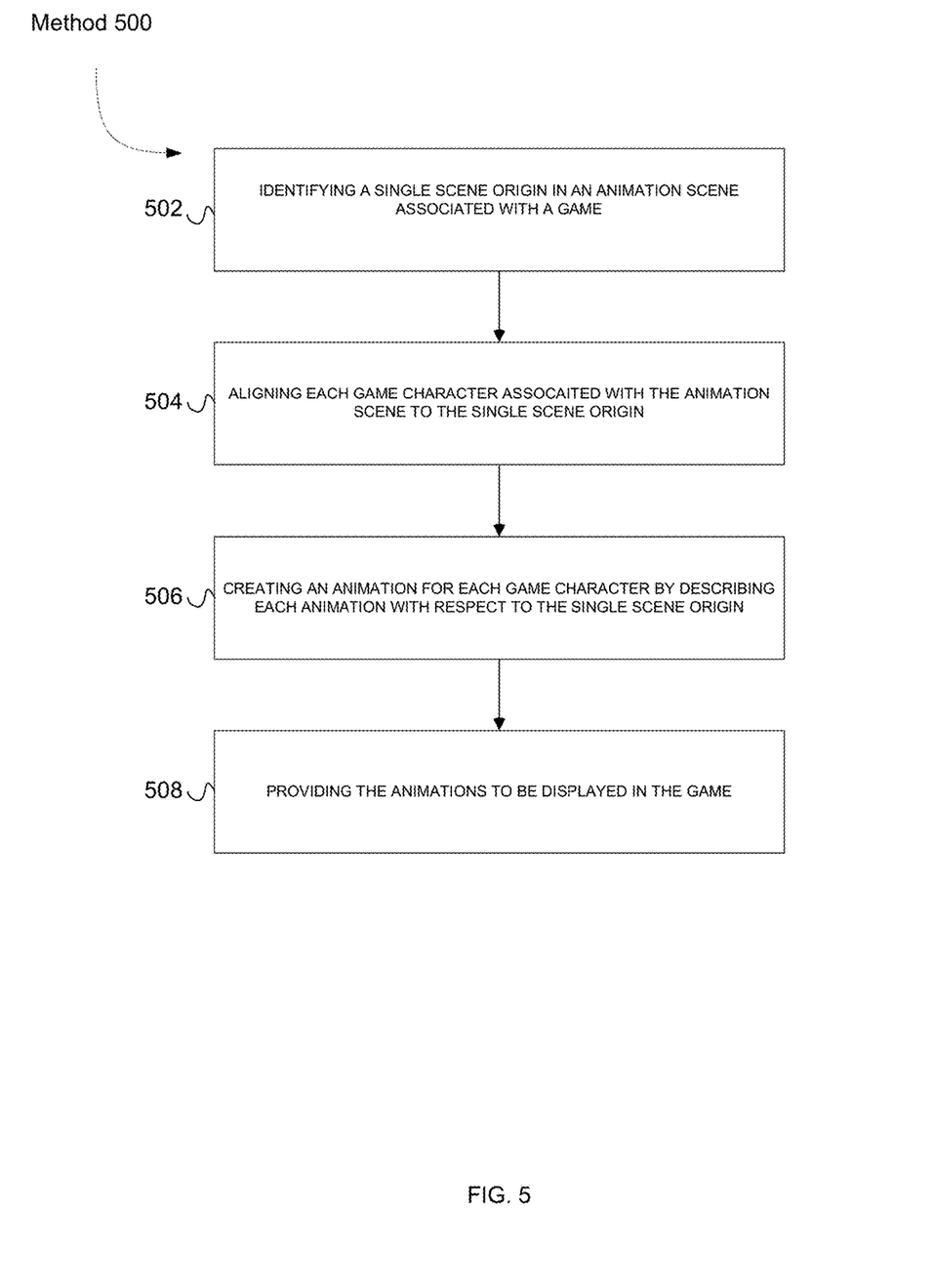
FIG. 5 is a flow diagram illustrating baked animation positions, according to an implementation.

FIG. 5 is a flow diagram illustrating baked animation positions, according to an implementation. The processing flow method 500 may be performed by processing logic that comprises hardware (e.g., circuitry, dedicated logic, programmable logic, microcode, etc.), software (e.g., instructions run on a processing device to perform hardware simulation), or a combination thereof. Method 500 can provide operations for a multi-character interaction scenario. In one embodiment, multi-character interaction scenario unit 104 may perform method 500. Method 500 may be performed in any order so as to fit the needs of the functionality to be provided. Referring to FIG. 5, at block 502, processing logic identifies a single scene origin in an animation scene associated with a game. In one embodiment, the scene origin may be a predefined 3-dimentional object placed in the scene of the game. In another embodiment, the scene origin may be a 2-dimentionoal planar surface from which objects may be oriented. The scene original may be a single point of origin in the scene, with respect to which all animations may be aligned. For example, a scene origin may be a wall on one end of a scene in a game. In another embodiment, the scene origin may be the basketball hoop in a basketball game. The scene origin may determine the point from which animations taking place in the scene are described. In one embodiment, an individual scene origin may be calculated for each scene participant (e.g., where the scene origin should be placed to allow that participant to play his animation to minimize any alignment). Processing logic may then determine a weighted average of the individual scene origins of all present participants to determine an actual scene origin to use. In one embodiment, the weights are user defined and can be customized per interaction scenario animation to control which characters are moved and how much they move during alignment. For example, for a tackle the tacklers can be made to do all the movement to attack the ball carrier. In this case, the tacklers may get a weight of 0 so that the ball carrier ideal scene origin is used, which forces the tacklers to come to him. In another embodiment, everyone may receive an equal weight so that they all equally participate in moving towards each other.

At block 504, processing logic aligns each game character associated with the animation scene to the single scene origin. In one embodiment, game characters are aligned with respect to a particular angle and distance from the scene origin. For example, a basketball player may be aligned into position on a path created by determining path line plot points with respect to a basketball hoop (the single scene origin). Both rotational and translation alignment may be described with respect to the scene origin. At block 506, processing logic creates an animation for each game character associated with the animation scene. In one embodiment, each animation is created by describing each animation with respect to the single scene origin without creating individual joints that are described with relation to one another. In one embodiment, the animation contains information indicating the animation movements with respect to the scene origin. All animation trajectories in a scene may be described with respect to a single point of origin (e.g., the scene origin). In one embodiment, the animation may include alignment information with respect to the scene origin, as described with respect to block 504. At block 508, processing logic provides the animation including the game character to be displayed in the game. Advantageously, aligning game characters and creating animations with respect to a scene origin instead of baking out individual joints and describing animations with respect to those joints, multi-character interacting scenarios are more efficiently authored and maintained.

FIG. 6A is a first block diagram illustrating wedge assignment, according to an implementation. In one embodiment, slots may be assigned using "wedges." In other embodiments, alternative assignment methods (e.g., grids) may be used. A wedge may be defined by an angle tolerance (e.g., minimum and maximum) and a distance tolerance (e.g., minimum and maximum). Wedges may be projected from a key character in an interaction scenario and candidates may be assigned slots based on which wedge they fall within and, in the case of multiple candidates for the same slot, based on additional content creator driven scoring (e.g., game state, closest to matching angle and/or distance, etc.). For example FIG. 6A designates 6 slots, 1-6, to which game characters may be assigned. The arrow 602 represents the key character in the scenario. In one embodiment, a slot's (e.g., a wedge's) physical conditions may have a constant relationship with animation slots assigned to individual animations in an interaction scenario. For example, if a slot pie wedge is defined to be 45 degrees with a 20 degree tolerance from a key character, animations in a scenario that include a character in the wedge may associate that character with the same slot (e.g., 45 degrees with a 20 degree tolerance). Advantageously, this allows various animations included in interaction scenarios to be compared with respect to the same standards.

Figure 6B:
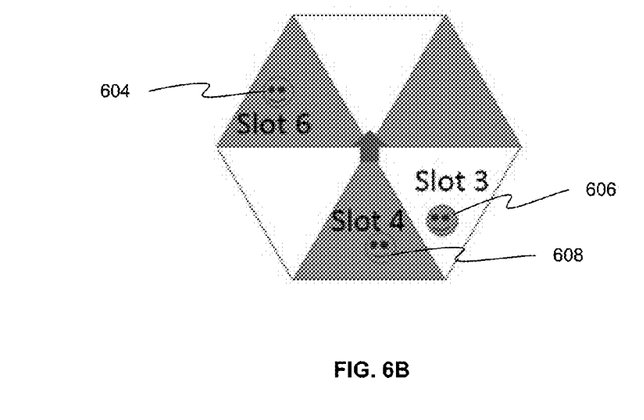
FIG. 6B is a second block diagram illustrating flexible slot assignment, according to an implementation.

FIG. 6B is a second block diagram illustrating wedge assignment, according to an implementation. In FIG. 6B, three characters 604, 606, 608 are each in three slots, 6, 3, and 4, respectively. Slot assignment when each game character is in a different slot may include assigning each character to their respective slot.

Figure 6C:
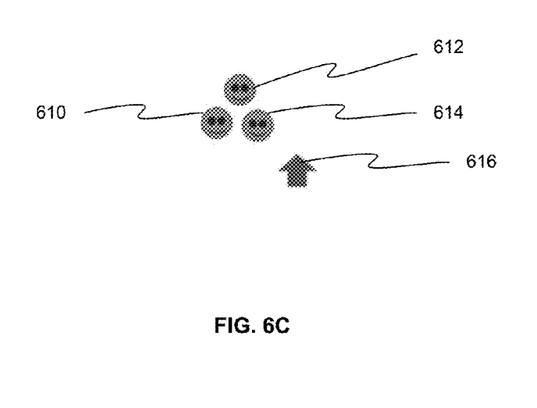
FIG. 6C is a third block diagram illustrating flexible slot assignment, according to an implementation.

FIG. 6C is a third block diagram illustrating wedge assignment, according to an implementation. In FIG. 6C, three characters 610, 612, 614 are approaching the key character 616 from the same position (e.g., what was previously considered to be slot 1). In such a case, characters may be assigned slots based on a flexible slotting scoring system that takes into account multiple factors. In one embodiment, instead of limiting the slot assignment to N characters coming from N pre-defined discrete directions (with some tolerance on each direction but no/minimal overlap), N characters coming from any combination of directions (even all from the same direction) may be allowed. For example, in the case of multiple game characters attacking a single opponent, any number of characters may be allowed to attack from any number of directions, or all from the same direction.

In one embodiment, each wedge may include 360 degrees but have a discrete facing. Each slot may have an angle preference but, if needed, any slot can be assigned to a candidate in any direction. Accordingly slot assignments may be performed as illustrated in FIG. 6D.

Figure 6D:
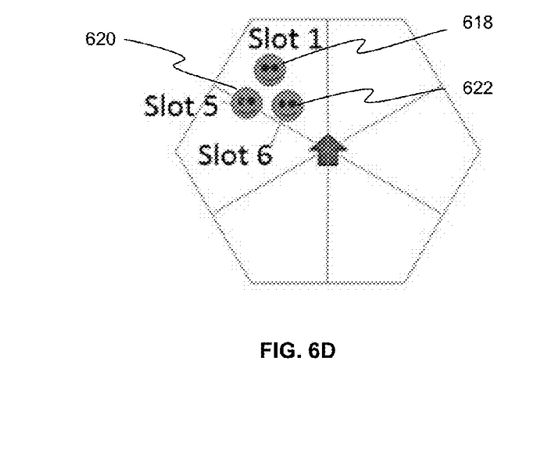
FIG. 6D is a fourth block diagram illustrating flexible slot assignment, according to an implementation.

FIG. 6D is a fourth block diagram illustrating wedge assignment, according to an implementation. In one embodiment, all candidates are scored for all slots then prioritized based on highest score. For example, all three candidates 618, 620, 622 may best be assigned to slot 6 but only one may be assigned to that slot. The closest candidate 622 to the key character may have the best score for Slot 6 so he may be assigned to that slot. The other candidates are then assigned to their next highest scoring slot.

Slot assignments may be performed according to the pseudo code described with respect to FIG. 2. For example, slots and candidates may be prioritized as described above and then their priority may be used to determine the score order. The assignment permutation may try to use higher scored virtual assignments (e.g., a slot and a candidate) before lower scored virtual assignments. Advantageously, this may allow the generated permutations to have the best combinations of slot assignments with a single pass and without having to generate and sort all possible permutations.

It is worth mentioning that although each wedge could occupy 360 degrees, it does not have to be so. For example, if there are not three characters coming from the front left in any of the available interaction scenario animations, processing logic may reduce the range of slot 5 and slot 1 to exclude that area. In this way, any undesirable assignments may be weeded out during the assignment process instead of assigning those characters to slots and going through selection to discover there is no match, thus limiting the total number of candidates for each slot, which in turn minimizes the number of assignment permutations to consider and maximizes performance.

In one embodiment, it may be the case that assigning the best candidates to a particular set of slots results in no matching scenario animation being found. It could be that other candidates assigned to those slots or the same candidates assigned to different slots would allow selection to match to available animation. In this case, assignment permutation may assist in determining alternative slot assignments for multiple selection attempts. Assignment permutation may be difficult due to the processing power and time required to permute the exponential number of combinations created by large numbers of candidates and slots. In one embodiment, processing logic may use a virtual assignment to associate each possible slot and candidate assignment pair with a unique index (e.g., VirtualAssignment). An algorithm may be employed to generate only the N best permutations (e.g., permutations that have the highest scoring candidates per slot) into a fixed sized list of PermutationEntries (where each PermutationEntry uses 3 bitsets to identify which slots are used, which candidates are used, and what the VirtualAssignments are). The processing logic may then attempt selection multiple times until a successful match is made or all available assignment permutations have been attempted. In one embodiment, an example algorithm:

generates the set of possible 'VirtualAssigments' (64 in an 8 candidates×8 slots example) and scores and sorts those 'VirtualAssigments' creates the first assignment permutation using the first VirtualAssignment then iterates each other virtual assignments in score order and, for each existing permutation, if the virtual assignment can be included (e.g., neither the slot nor character is already in use)

merge this Virtual Assignment in otherwise, if the allotted permutation count has not been met, create a new permutation of this permutation which includes this virtual assignment (by ejecting the VirtualAssignment(s) that were causing a conflict).

Performs additional logic to ensure redundant permutations are not generated (superset or subset of another permutation)

Once all permutations are full or all Virtual Assignments have been used, a set of permutations to try results.

Figure 7:
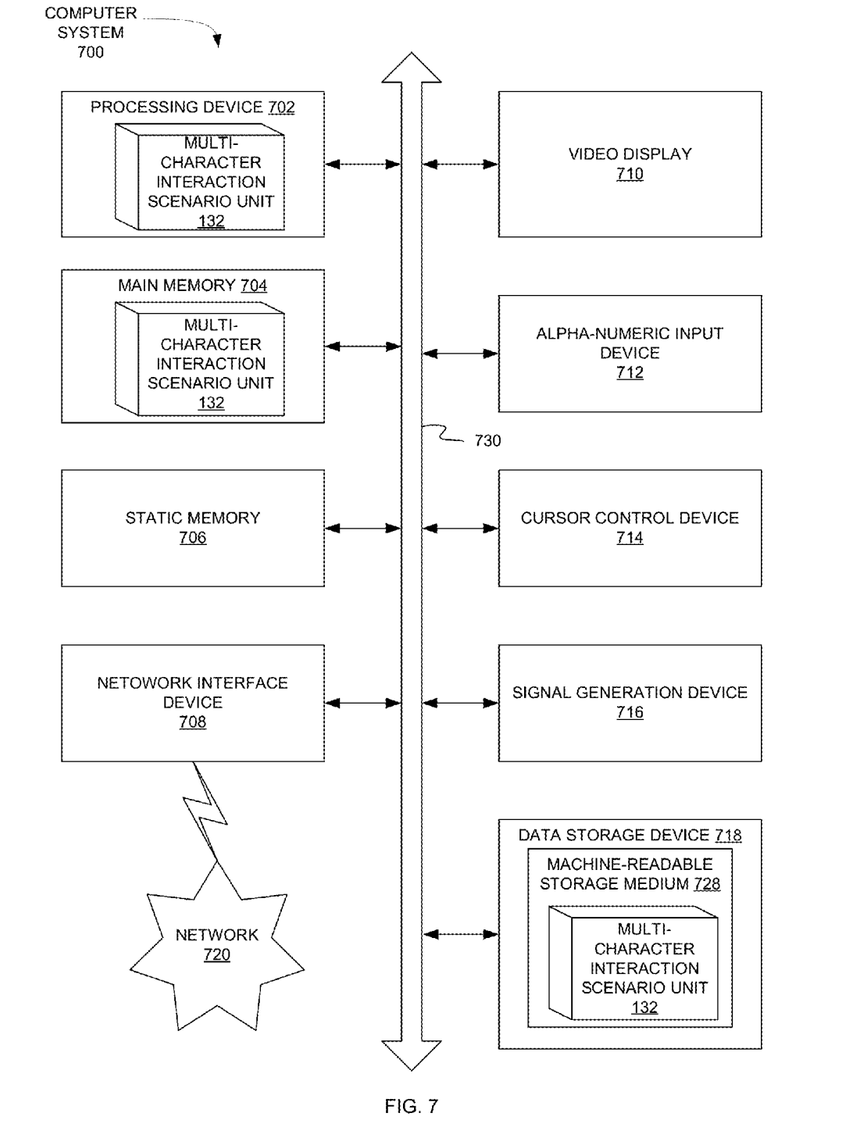
FIG. 7 is a block diagram of an example computer system that may perform one or more of the operations described herein.

FIG. 7 illustrates a diagrammatic representation of a computing device 700 which may implement the systems and methods described herein. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute multi-character interaction scenario unit 104 implementing methods 300, 400, and 500 for carrying out multi-character interaction scenario operations, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions of multi-character interaction scenario unit 104 implementing methods 300, 400, and 500 for carrying out multi-character interaction scenario operations, in accordance with one or more aspects of the present disclosure. Instructions implementing module 726 may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "identifying", "assigning", "selecting", "providing", "creating", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   identifying, by a processing device, a plurality of game characters associated with a video game;
   selecting an interaction scenario of the video game, the interaction scenario including the plurality of game characters;
   iterating, in a pre-defined order of animation role priorities, through a list of animation roles associated with the interaction scenario, to assign a respective animation role of the list of animation roles to each game character of the plurality of game characters;
   selecting, for each game character of the plurality of game characters, based on the respective animation role associated with the game character, an interaction scenario animation associated with the interaction scenario; and
   causing each game character of the plurality of game characters to be displayed in the video game using the respective interaction scenario animation.

2. The method of claim 1, further comprising:
   aligning a game character of the plurality of game characters to a position determined by the respective animation role.

3. The method of claim 2, wherein the aligning is performed during animation playback of the interaction scenario animation.

4. The method of claim 2, wherein the aligning comprises calculating a rotation for the game character.

5. The method of claim 1, further comprising:
aligning a first game character of the plurality of game characters to a second game character of the plurality of game characters; and
maintaining alignment to the first game character by the second game character while the first game character is moving.

6. The method of claim 1, wherein assigning the respective animation role is based on at least one of a set of contextual conditions or a set of spatial conditions.

7. The method of claim 1, wherein the plurality of game characters of the interaction scenario further comprises one or more optional game characters.

8. The method of claim 1, further comprising:
identifying a game character to be added to the interaction scenario;
comparing a time metric associated with the game character to a late entry threshold;
determining that the game character is eligible to be added to the interaction scenario based on the comparison; and
allowing the game character to enter the interaction scenario.

9. The method of claim 1, further comprising:
identifying an entry window to the interaction scenario for each of the plurality of game characters.

10. The method of claim 1, wherein the animation role priorities are assigned based on a number of occurrences of each animation role in the interaction scenario.

11. A system comprising:
a memory; and
a processing device, operatively coupled to the memory, the processing device to:
identify a plurality of game characters associated with a video game;
select an interaction scenario of the video game, the interaction scenario including the plurality of game characters;
iterate, in a pre-defined order of animation role priorities, through a list of animation roles associated with the interaction scenario, to assign a respective animation role of the list of animation roles to each game character of the plurality of game characters;
select, for each game character of the plurality of game characters, based on the respective animation role associated with the game character, an interaction scenario animation associated with the interaction scenario; and
cause each game character of the plurality of game characters to be displayed in the video game using the respective interaction scenario animation.

12. The system of claim 11, wherein the processing device is further to: align a game character of the plurality of game characters to a position determined by the respective animation role.

13. The system of claim 12, wherein the aligning is performed during animation playback of the interaction scenario animation.

14. The system of claim 12, wherein the processing device is further to:
align a first game character of the plurality of game characters to a second game character of the plurality of game characters; and
maintain alignment to the first game character by the second game character while the first game character is moving.

15. The system of claim 11, wherein the processing device is further to:
identify a game character to be added to the interaction scenario;
compare a time metric associated with the game character to a late entry threshold;
determine that the game character is eligible to be added to the interaction scenario based on the comparison; and
allow the game character to enter the interaction scenario.

16. A non-transitory machine readable storage medium storing instructions which when executed cause a processing device to:
identify a plurality of game characters associated with a game;
select an interaction scenario of the video game, the interaction scenario including the plurality of game characters;
iterate, in a pre-defined order of animation role priorities, through a list of animation roles associated with the interaction scenario, to assign a respective animation role of the list of animation roles to each game character of the plurality of game characters;
select, for each game character of the plurality of game characters, based on the respective animation role associated with the game character, an interaction scenario animation associated with the interaction scenario; and
cause each game character of the plurality of game characters to be displayed in the video game using the respective interaction scenario animation.

17. The non-transitory machine readable storage medium of claim 16, further comprising executable instructions to cause the processing device to:
align a game character of the plurality of game characters to a position determined by the respective animation role.

18. The non-transitory machine readable storage medium of claim 17, wherein the aligning is performed during animation playback of the interaction scenario animation.

19. The non-transitory machine readable storage medium of claim 17, further comprising executable instructions to cause the processing device to:
align a first game character of the plurality of game characters to a second game character of the plurality of game characters; and
maintain alignment to the first game character by the second game character while the first game character is moving.

20. The non-transitory machine readable storage medium of claim 16, further comprising executable instructions to cause the processing device to:
identify an entry window to the interaction scenario for each of the plurality of game characters.

* * * * *